(12) United States Patent
Lin et al.

(10) Patent No.: US 10,991,928 B2
(45) Date of Patent: *Apr. 27, 2021

(54) BATTERY CONNECTION MODULE AND BATTERY DEVICE

(71) Applicant: Molex, LLC, Lisle, IL (US)

(72) Inventors: Yong Lin, Taipei (TW); Shang Xiu Zeng, ChengDu (CN); Kian Heng Lim, Singapore (SG)

(73) Assignee: Molex, LLC, Lisle, IL (US)

( * ) Notice: Subject to any disclaimer, the term of this patent is extended or adjusted under 35 U.S.C. 154(b) by 311 days.

This patent is subject to a terminal disclaimer.

(21) Appl. No.: 15/816,614

(22) Filed: Nov. 17, 2017

(65) Prior Publication Data

US 2018/0175357 A1    Jun. 21, 2018

(30) Foreign Application Priority Data

Dec. 19, 2016   (CN) .......................... 201611176967.0

(51) Int. Cl.
*H01M 2/00* (2006.01)
*H01M 2/20* (2006.01)
(Continued)

(52) U.S. Cl.
CPC ......... *H01M 2/202* (2013.01); *H01M 2/0242* (2013.01); *H01M 2/043* (2013.01);
(Continued)

(58) Field of Classification Search
CPC .... H01M 2/202; H01M 2/0242; H01M 2/266; H01M 2/1077; H01M 2/043; H01M 10/425; H01M 2/365; H01M 2/1016
See application file for complete search history.

(56) References Cited

U.S. PATENT DOCUMENTS

| 1,468,051 A | 9/1923 | Thompson |
| 9,705,161 B2 | 7/2017 | Nishihara et al. |

(Continued)

FOREIGN PATENT DOCUMENTS

| CN | 104011901 A | 8/2014 |
| CN | 105870389 A | 8/2016 |

(Continued)

*Primary Examiner* — Nicholas P D'Aniello

(57) ABSTRACT

A battery connection module and a battery device are provided. The battery device comprises a battery box and a battery connection module. The battery connection module comprises a circuit board, a plurality of busbars and a covering mechanism. The plurality of busbars are provided to a bottom surface of the circuit board in two rows spaced apart from each other. Each busbar has a main body portion connecting with the circuit board and at least two electrode connecting portions. The covering mechanism is provided to the bottom surface of the circuit board and comprises a plurality of sealing units. Each sealing unit comprises a cover, two first sealing members and a second sealing member. The cover has two openings, the two openings are respectively sheathed on two corresponding electrode connecting portions which are positioned along the second direction and respectively belong to the two rows of the busbars, the two first sealing members are respectively positioned in the two openings to liquid-tight seal a gap between the cover and the corresponding electrode connecting portion, the second sealing member is positioned in the corresponding chamber to liquid-tight seal a gap between the cover and the box body.

25 Claims, 13 Drawing Sheets

(51) Int. Cl.
  *H01M 2/36* (2006.01)
  *H01M 2/10* (2006.01)
  *H01M 2/26* (2006.01)
  *H01M 2/04* (2006.01)
  *H01M 10/42* (2006.01)
  *H01M 2/02* (2006.01)

(52) U.S. Cl.
  CPC ....... *H01M 2/1016* (2013.01); *H01M 2/1077* (2013.01); *H01M 2/266* (2013.01); *H01M 2/365* (2013.01); *H01M 10/425* (2013.01)

(56) References Cited

U.S. PATENT DOCUMENTS

| | | |
|---|---|---|
| 2010/0124693 A1 | 5/2010 | Kosugi et al. |
| 2011/0229754 A1 | 9/2011 | Zhao et al. |
| 2013/0252071 A1 | 9/2013 | Teramoto et al. |
| 2014/0127551 A1 | 5/2014 | Kim |
| 2014/0356668 A1 | 12/2014 | Kim |
| 2015/0072208 A1 | 3/2015 | Balk et al. |
| 2018/0130989 A1 | 5/2018 | Saito et al. |
| 2018/0175358 A1* | 6/2018 | Lin .................. H01M 2/202 |

FOREIGN PATENT DOCUMENTS

| | | |
|---|---|---|
| EP | 3007246 A1 | 4/2016 |
| JP | 64-021860 A | 1/1989 |
| JP | 2004-265830 A | 9/2004 |
| JP | 2009-277420 A | 11/2009 |
| JP | 2009-289429 A | 12/2009 |
| JP | 2012-226840 A | 11/2012 |
| JP | 2013-143271 A | 7/2013 |
| JP | 2013-161630 A | 8/2013 |
| JP | 2014-103031 A | 6/2014 |
| JP | 2015-099567 A | 5/2015 |
| JP | 2015-099657 A | 5/2015 |
| JP | 2015-133223 A | 7/2015 |
| KR | 2012-0051808 A | 5/2012 |
| WO | WO 2012-133710 A1 | 10/2012 |

\* cited by examiner

BATTERY CONNECTION MODULE AND BATTERY DEVICE

RELATED APPLICATIONS

This application claims priority to Chinese Application No. 201611176967.0, filed Dec. 19, 2016, which is incorporated herein by reference in its entirety.

TECHNICAL FIELD

The present disclosure relates to a battery connection module, particularly relates to for a battery connection module for electrically connecting with and sealing a plurality of liquid battery cells and a battery device.

BACKGROUND ART

At present generally known battery device composed by a plurality of battery cells, in which most of the battery cells use a solid battery block, such as disclosed in US 2014/0127551A1 and US 2014/0356668 A1.

Because a structure of the solid battery block and a structure of a liquid battery cell has a great difference, when a battery device assembled by a plurality of solid battery blocks and a battery device assembled by a plurality of liquid battery cells are compared, the two battery devices are different in the whole assembling structure and electrode connecting structure design. However, most of the previous disclosed patent documents are used for assembling technique with respect to the solid battery block, so there is still a developed space for how to make assembling of the liquid battery cells more convenient and sealing effect better.

SUMMARY

Therefore, one object of the present disclosure is to provide a battery connection module for sealing a plurality of liquid battery cells and making electrodes of the plurality of battery cells connected in series.

Therefore, another object of the present disclosure is to provide a battery device which has a plurality of liquid battery cells and has good sealing.

Accordingly, in some embodiments, a battery connection module of the present disclosure comprises a circuit board, a plurality of busbars and a covering mechanism. The circuit board extends along a first direction and is provided with circuit traces. The plurality of busbars are provided to a bottom surface of the circuit board in two rows spaced apart from each other and electrically connect with the circuit traces, and each row is arranged along the first direction, each busbar has a main body portion connecting with the circuit board and at least two electrode connecting portions. The covering mechanism is provided to the bottom surface of the circuit board and comprises a plurality of sealing units arranged along the first direction, each sealing unit comprises a cover, two first sealing members and a second sealing member, the cover extends along a second direction perpendicular to the first direction and has two openings arranged along the second direction, the two openings are respectively sheathed on two corresponding electrode connecting portions which are positioned along the second direction and respectively belong to the two rows of the busbars, the two first sealing members are respectively positioned in the two openings and each are interposed between the cover and the electrode connecting portion to liquid-tight seal a gap between the cover and the electrode connecting portion, the second sealing member is provided to an outer periphery of the cover.

In some embodiments, each electrode connecting portion of each busbar protrudes from the main body portion away from the bottom surface of the circuit board and exhibits as a protruding block.

In some embodiments, each first sealing member of each sealing unit is provided in form of gasket and is sheathed on an outer periphery of the electrode connecting portion.

In some embodiments, the cover of each sealing unit further has a base portion connecting with the circuit board and a plugging portion protruding from the base portion, and an outer periphery of the plugging portion is tapered inwardly relative to an outer periphery of the base portion, and the openings pass through the base portion and the plugging portion.

In some embodiments, the second sealing member of each sealing unit is provided in form of gasket and is sheathed on the outer periphery of the plugging portion.

In some embodiments, the cover of each sealing unit further has a plurality of fixing posts, the circuit board and the plurality of busbars each have a corresponding fixing hole for passing through and fixing the corresponding fixing post.

In some embodiments, each busbar has two fixing holes, the cover of each sealing unit has two fixing posts which are diagonally provided to the cover and each pass through one fixing hole of two busbars respectively belonging to the two rows, and the two fixing holes of each busbar each are passed through by one fixing post of one cover of two adjacent covers.

In some embodiments, the plurality of fixing posts each are fixed and latched in the fixing hole by hot melt manner.

In some embodiments, the covers of the plurality of sealing units are separated from each other and each are independently provided to the circuit board.

In some embodiments, the circuit traces of the circuit board are provided to the bottom surface of the circuit board and the main body portions of the plurality of the busbars are welded to the circuit traces.

Accordingly, in some embodiments, a battery device of the present disclosure battery device comprises a battery box and a battery connection module. The battery box has a box body and a plurality of battery cells, the box body has a plurality of spacing walls arranged along a first direction and spaced apart from each other to define a plurality of chambers, and the plurality of battery cells are respectively provided to the plurality of chambers, each battery cell comprises a battery liquid and electrodes. The battery connection module comprises a circuit board, a plurality of busbars and a covering mechanism. The circuit board extends along the first direction and is provided with circuit traces. The plurality of busbars are provided to a bottom surface of the circuit board in two rows spaced apart from each other and electrically connect with the circuit traces, and each row is arranged along the first direction, each busbar has a main body portion connecting with the circuit board and at least two electrode connecting portions, the electrode connecting portions respectively connect with the electrodes in different chambers so as to make the electrodes in the plurality of chambers connected in series. The covering mechanism is provided to the bottom surface of the circuit board and comprises a plurality of sealing units arranged along the first direction, and the plurality of sealing units respectively correspond to the plurality of chambers, each sealing unit comprises a cover, two first sealing members and a second sealing member, the cover extends along a second direction perpendicular to the first direction and has two openings arranged along the second direction, the two openings are respectively sheathed on two corresponding electrode connecting portions which are positioned along the second direction and respectively belong to the two rows of the busbars, the two first sealing members are respectively positioned in the two openings and each are interposed between the cover and the electrode connecting portion to liquid-tight seal a gap between the cover and the electrode connecting portion, the second sealing member is positioned in the corresponding chamber and is interposed between the cover and the box body to liquid-tight seal a gap between the cover and the box body.

In some embodiments, each electrode connecting portion of each busbar protrudes from the main body portion away from the bottom surface of the circuit board and exhibits as a protruding block.

In some embodiments, each first sealing member of each sealing unit is provided in form of gasket and is sheathed on an outer periphery of the electrode connecting portion.

In some embodiments, the cover of each sealing unit further has a base portion connecting with the circuit board and a plugging portion protruding from the base portion, and an outer periphery of the plugging portion is tapered inwardly relative to an outer periphery of the base portion, and the openings pass through the base portion and the plugging portion.

In some embodiments, the second sealing member of each sealing unit is provided in form of gasket and is sheathed on the outer periphery of the plugging portion.

In some embodiments, the plugging portion has two side protruding ribs extending along the second direction and positioned at two opposite sides and protruding toward the corresponding chamber, and each side protruding rib is formed with a latching channel extending along the second direction and adjacent to the base portion, a top portion of each spacing wall is formed with two latching edge portions respectively protruding toward two adjacent chambers to respectively enter into two corresponding latching channels and allow two corresponding side protruding ribs to respectively latch with and abut against the two latching edge portions.

In some embodiments, each side protruding rib is further formed with a latching groove spaced apart from the latching channel and away from the base portion relative to the latching channel and allowing the second sealing member to latch with the latching groove.

In some embodiments, the cover of each sealing unit further has a plurality of fixing posts, the circuit board and the plurality of busbars each have a corresponding fixing hole for passing through and fixing the corresponding fixing post.

In some embodiments, each busbar has two fixing holes, the cover of each sealing unit has two fixing posts which are diagonally provided to the cover and each pass through one fixing hole of two busbars respectively belonging to the two rows, and the two fixing holes of each busbar each are passed through by one fixing post of one cover of two adjacent covers.

In some embodiments, the plurality of fixing posts each are fixed and latched in the fixing hole by hot melt manner.

In some embodiments, the cover of each sealing unit is formed with a first liquid injecting hole which may be communicated with the chamber, the circuit board is formed with a plurality of second liquid injecting holes respectively corresponding to the first liquid injecting holes of the plurality of sealing units.

In some embodiments, the covers of the plurality of sealing units are separated from each other and each are independently provided to the circuit board.

In some embodiments, the circuit traces of the circuit board are provided to the bottom surface of the circuit board and the main body portions of the plurality of the busbars are welded to the circuit traces.

The present disclosure at least has the following effect: the battery connection module can be assembled as a module in advance, and incorporates the busbars and the covering mechanism on the circuit board, the assembling process of the battery connection module and the battery box is simpler, more convenient and easily operated, and can be indeed seal the battery liquid, and can make the plurality of electrodes in the battery box to electrically connected.

BRIEF DESCRIPTION OF THE DRAWINGS

Other features and effects of the present disclosure will be apparent through embodiments in combination with accompanying figures in which:

FIG. 10 is assembled;

DETAILED DESCRIPTION OF THE PREFERRED EMBODIMENTS

Figure 1:
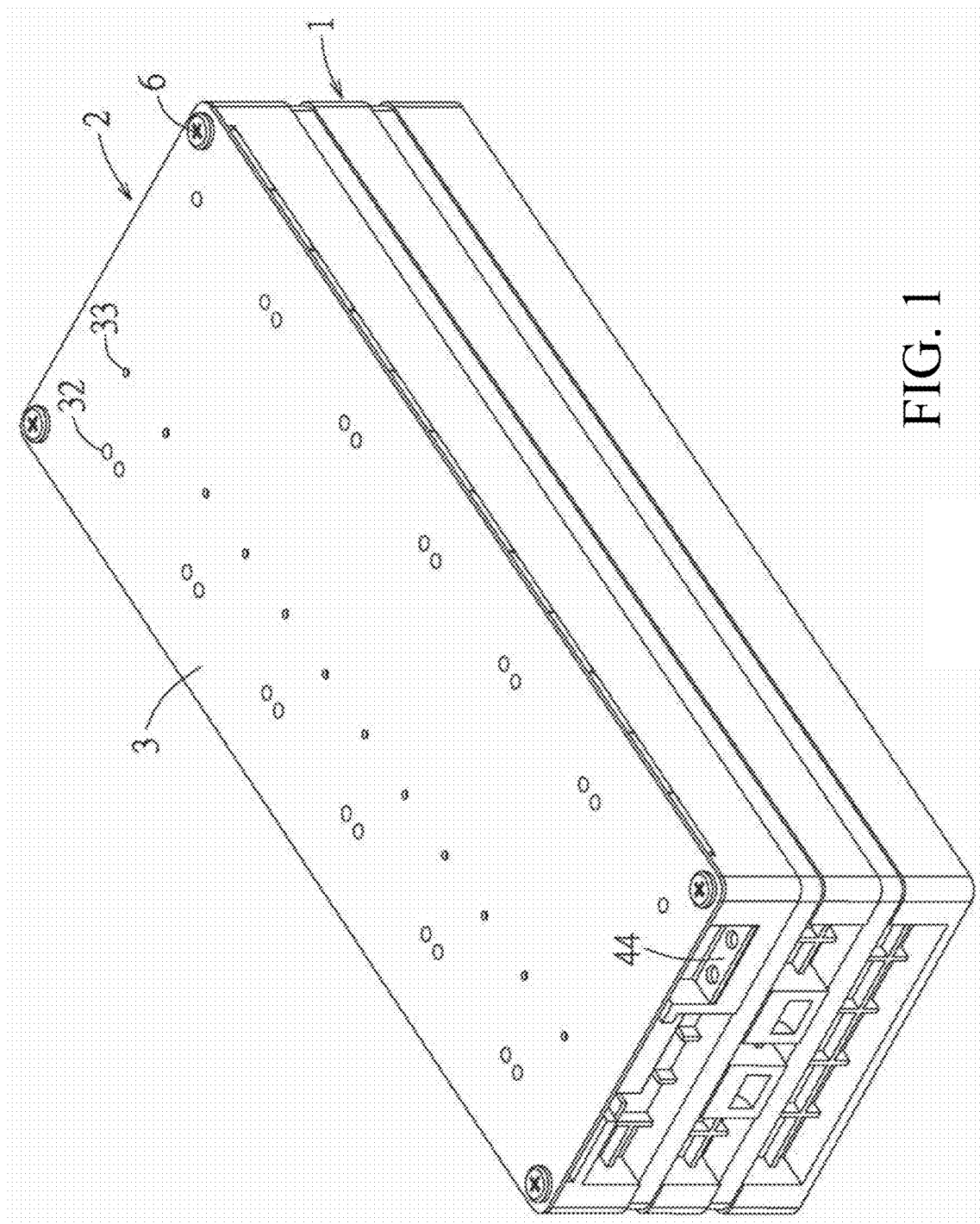
FIG. 1 is a perspective view of an embodiment of a battery device of the present disclosure.
Figure 2:
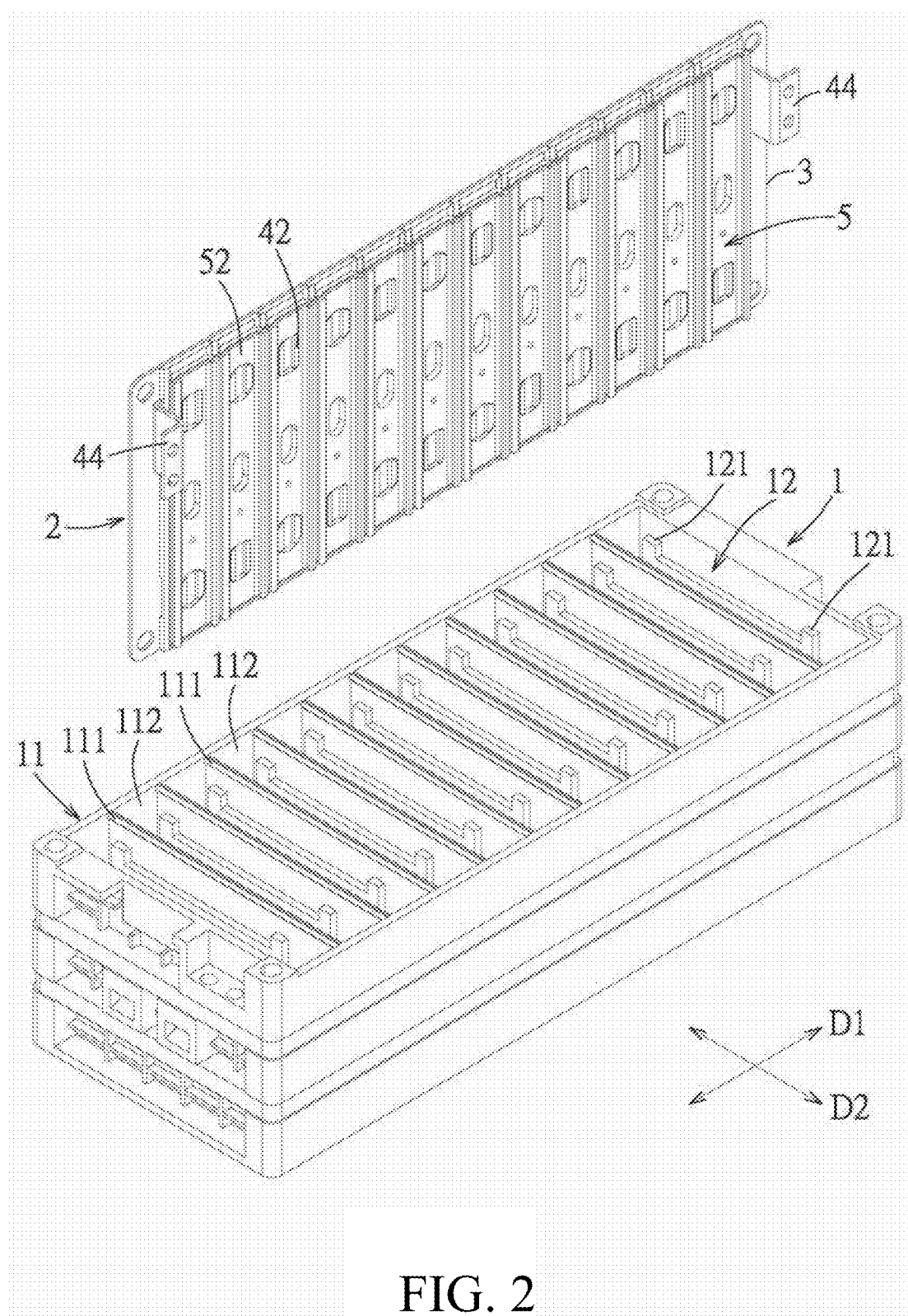
FIG. 2 is a perspective exploded view of the embodiment illustrating an assembling relationship of a battery connection module and a battery box.
Figure 3:
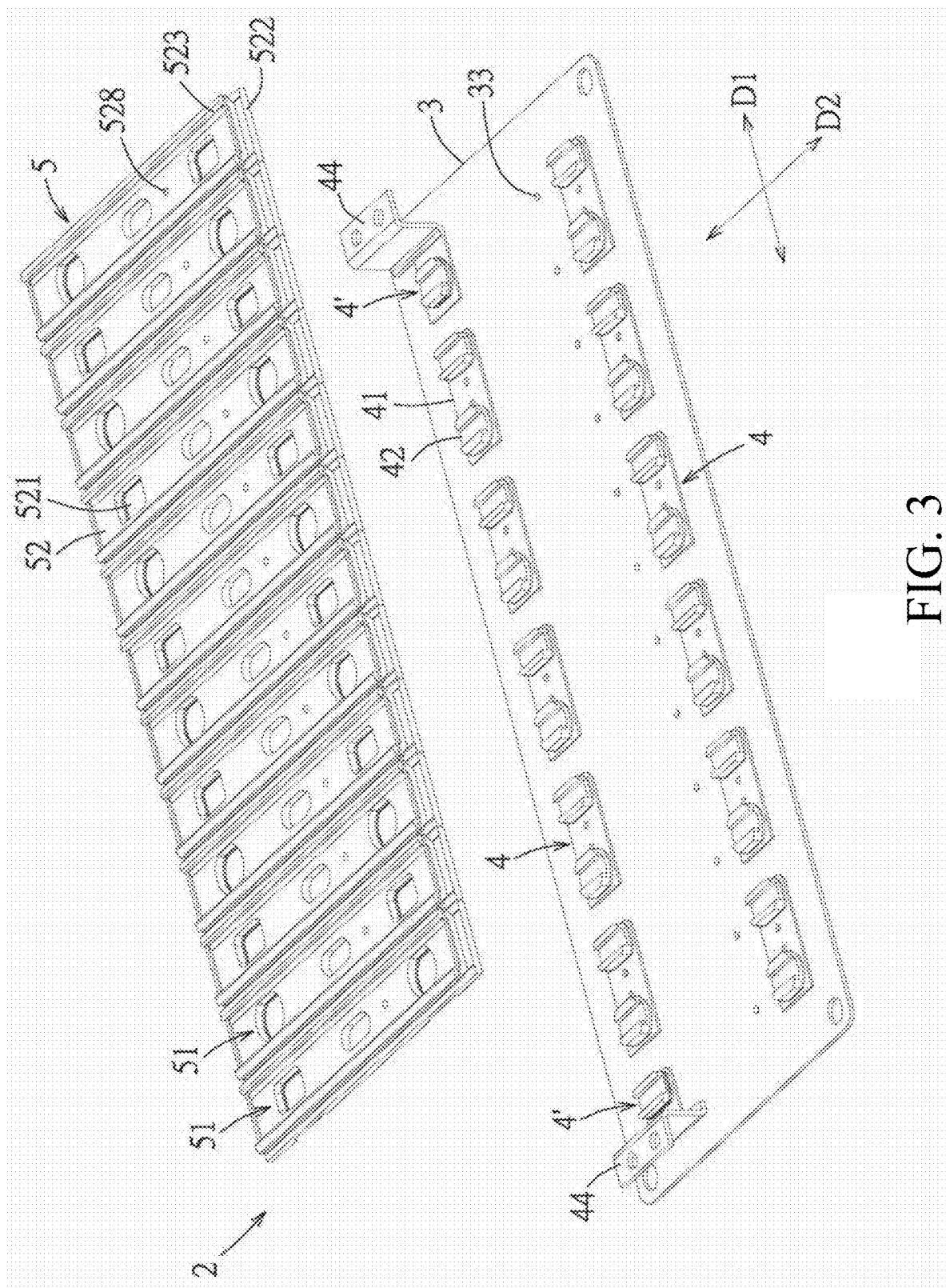
FIG. 3 is a perspective exploded view of the embodiment illustrating an assembling relationship of a covering mechanism and a circuit board and a plurality of busbars of the battery connection module.
Figure 4:
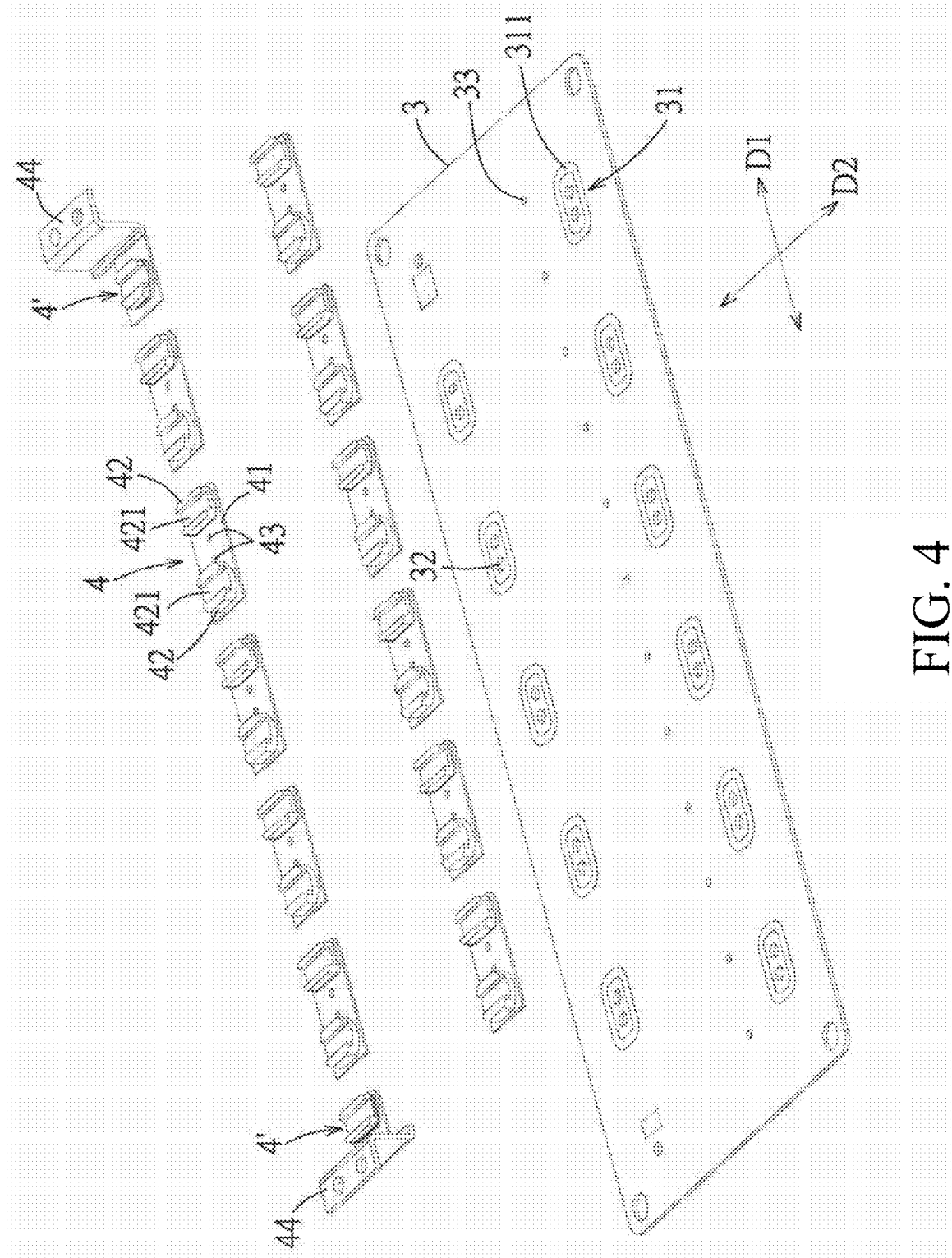
FIG. 4 is a perspective exploded view of the embodiment illustrating an assembling relationship of the circuit board and the plurality of busbars.

Referring to FIG. 1 and FIG. 2, an embodiment of a battery device of the present disclosure comprises a battery box 1 and a battery connection module 2. The battery box 1 has a box body 11 and a plurality of battery cells 12. The box body 11 has a plurality of spacing walls 111 which are arranged along a first direction D1 and spaced apart from each other to define a plurality of chambers 112, and the plurality of battery cells 12 are respectively provided to the plurality of chambers 112, each battery cell 12 comprises a battery liquid (not shown) and electrodes 121 (generally are a positive electrode and a negative electrode).

Referring to FIG. 3 to FIG. 6, the battery connection module 2 comprises a circuit board 3, a plurality of busbars 4 and a covering mechanism 5. The circuit board 3 extends along the first direction D1 and is provided with circuit traces 31. The circuit board 3 may be a printed circuit board, or an insulating substrate with circuit traces 31 provided by any known embedding, etching, plating and the like, and the circuit board 3 may be also additionally provided with various components, such as an electronic element, a sensor, a fuse, a connector and the like. In the embodiment, the circuit traces 31 comprise a plurality of soldering pads 311 provided to a bottom surface of the circuit board 3 for connecting with the plurality of busbars 4.

Figure 5:
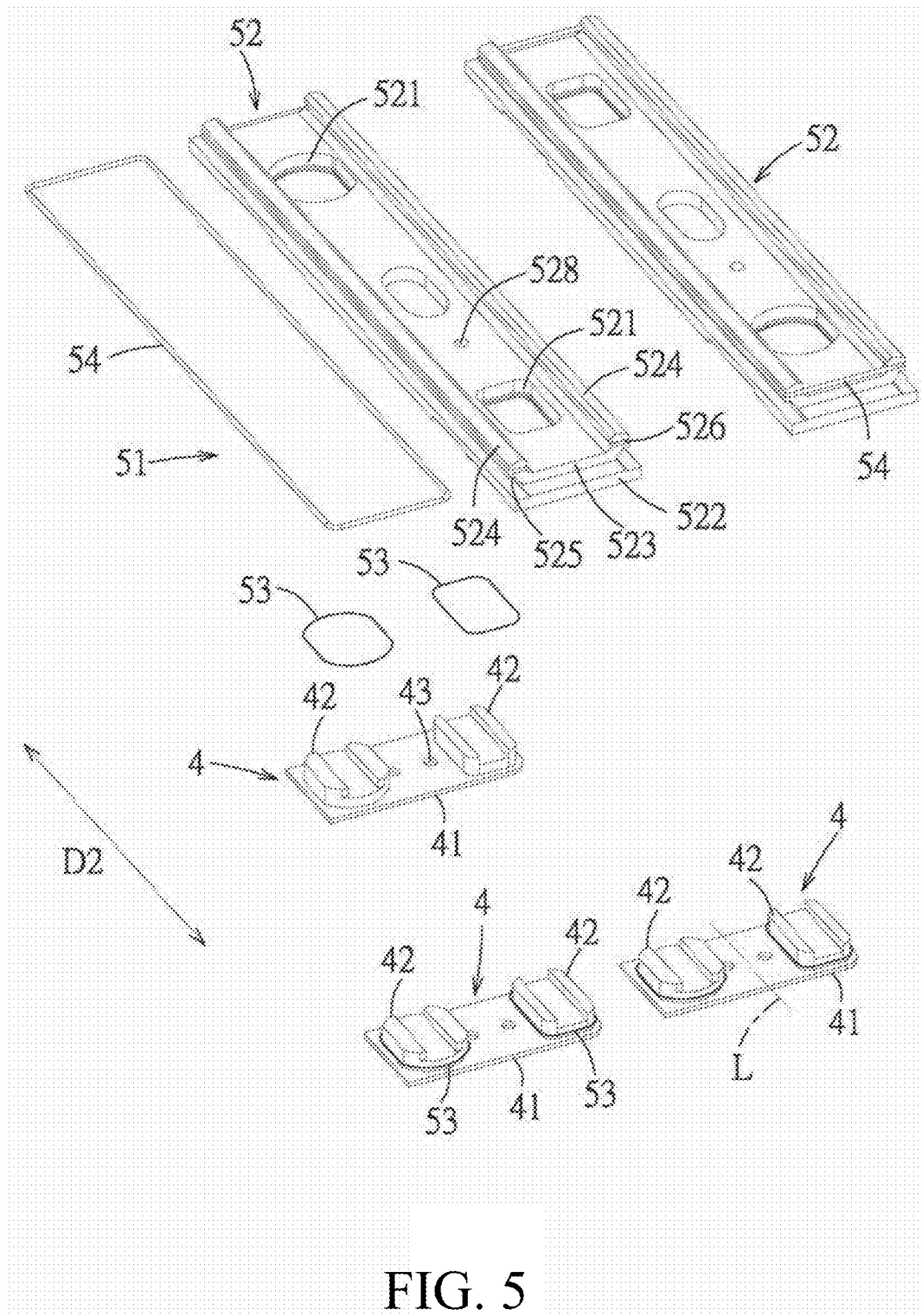
FIG. 5 is a perspective exploded view of the embodiment illustrating an assembling relationship of each sealing unit of the covering mechanism and the corresponding busbars.
Figure 6:
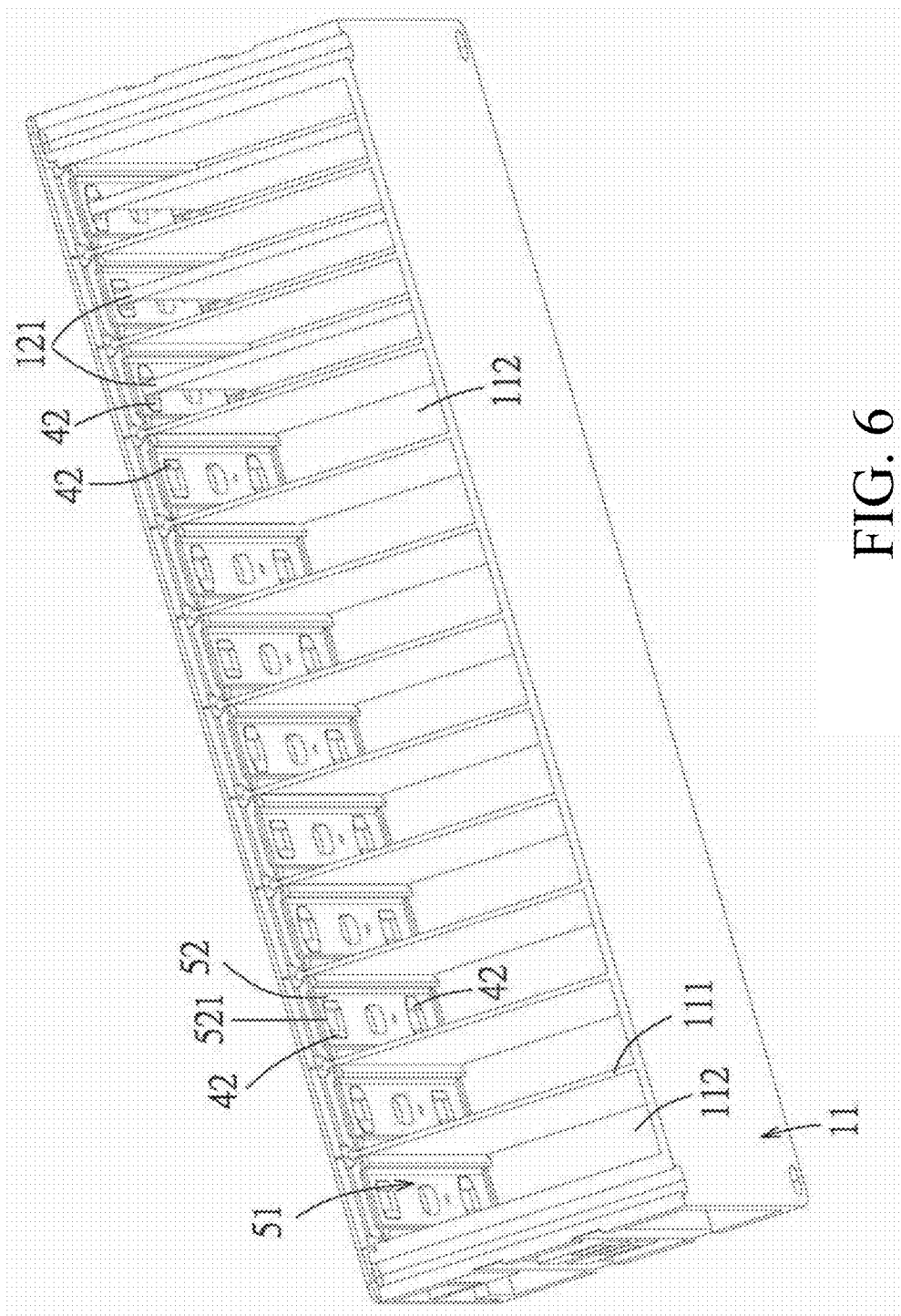
FIG. 6 is a perspective sectional view of the embodiment illustrating an assembling relationship of the battery connection module and the battery box.
Figure 7:
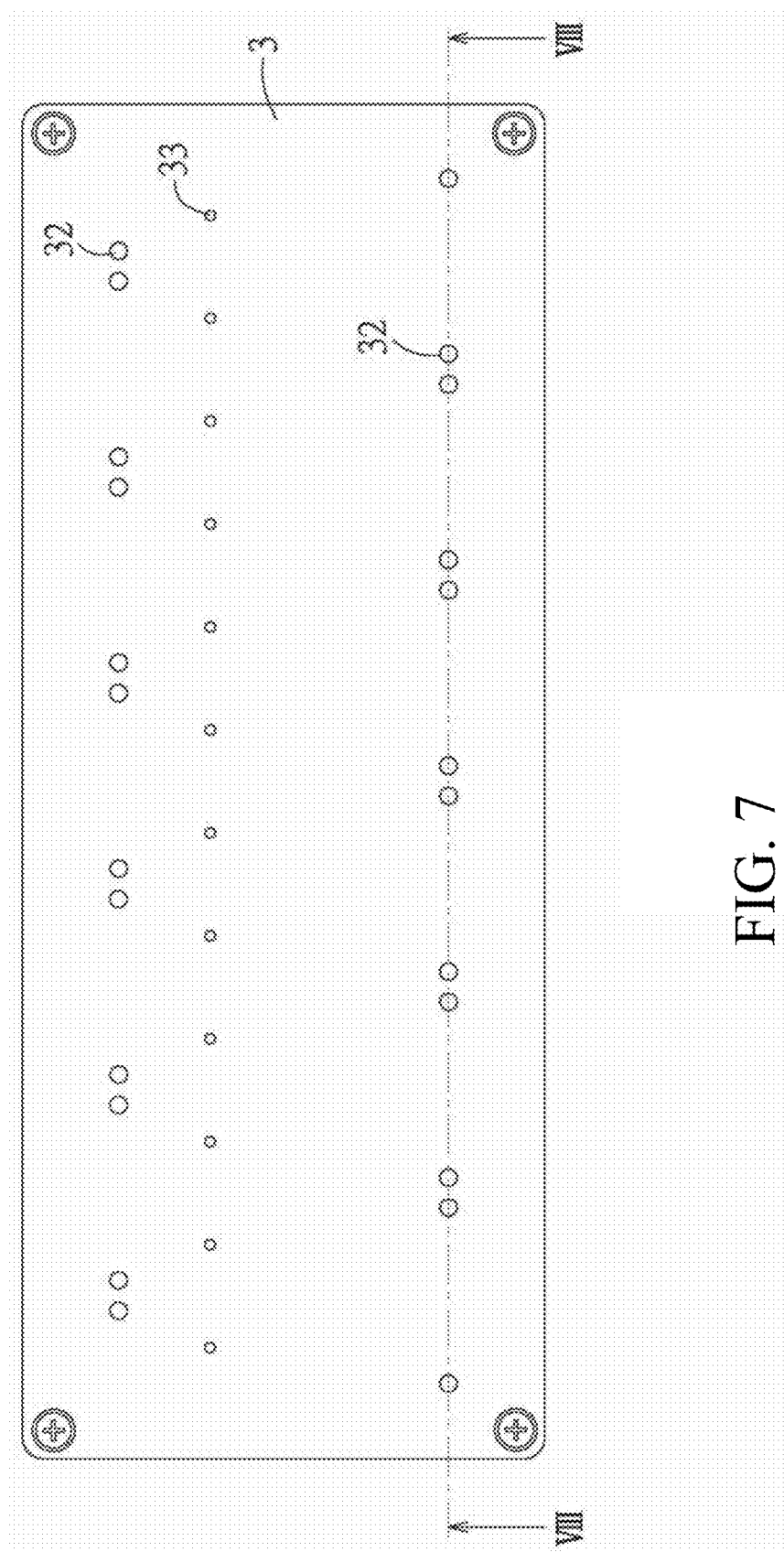
FIG. 7 is a top view of the embodiment.
Figure 8:
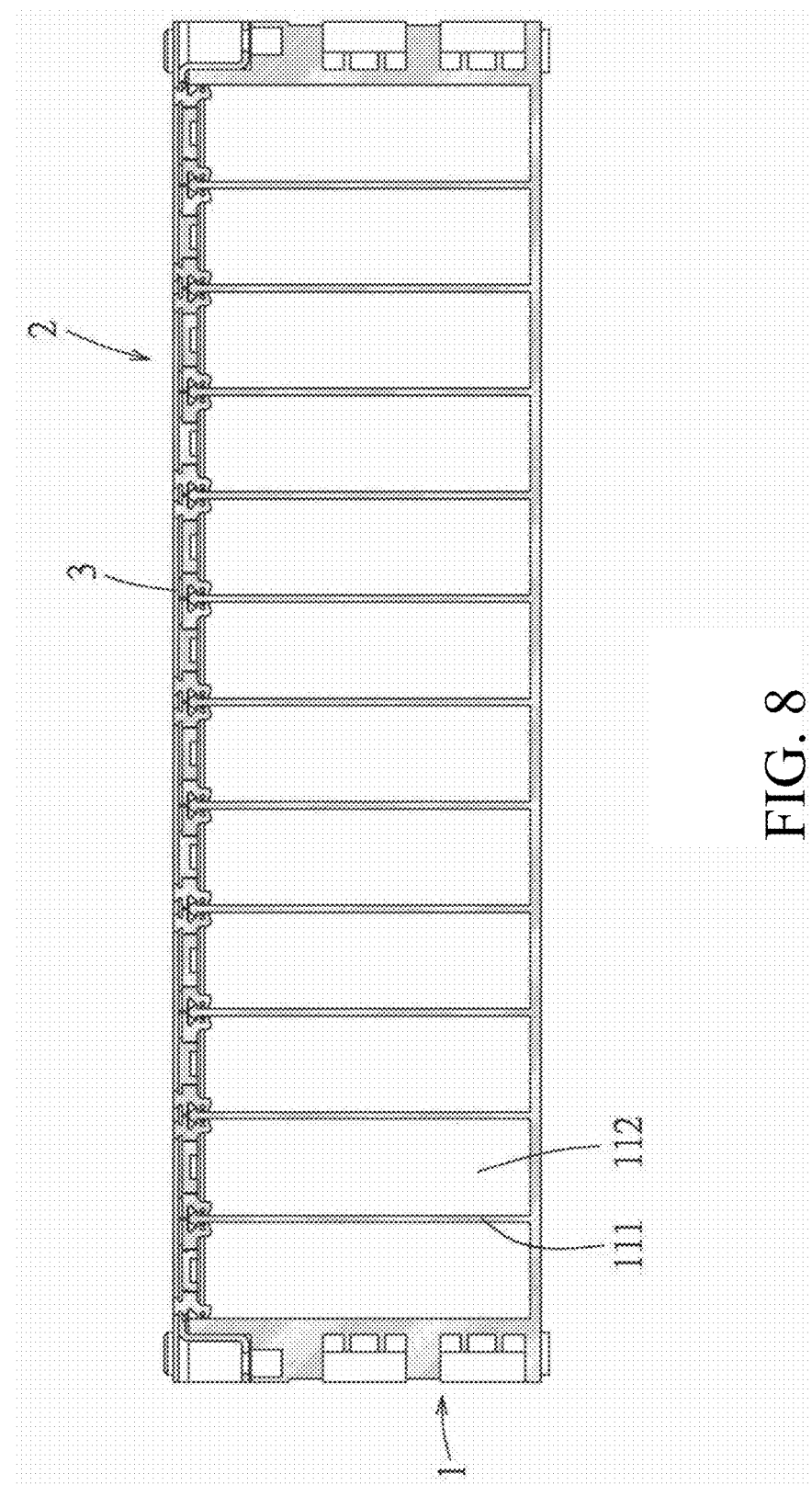
FIG. 8 is a cross sectional view taken along a line VIII-VIII of FIG. 7.

The plurality of busbars 4 are provided to the bottom surface of the circuit board 3 as two rows spaced apart from each other and electrically connect with the circuit traces 31, and each row is arranged along the first direction D1. Each busbar 4 has a main body portion 41 connecting with the circuit board 3 and at least two electrode connecting portions 42 protruding from the main body portion 41. A plurality of electrode connecting portions 42 respectively connect with the electrodes 121 in different chambers 112, so as to make the electrodes 121 in the plurality of chambers 112 connected in series. In the embodiment, each busbar 4 has two electrode connecting portions 42, and positions of the busbars 4 of the two rows are staggered in a second direction D2 perpendicular to the first direction D1, so that two positions of the two electrode connecting portions 42 of each busbar 4 of one row respectively correspond to two positions of two adjacent electrode connecting portions 42 of two adjacent busbars 4 of the other row in the second direction D2, so as to make the plurality of battery cells 12 connected in series. In a varied embodiment, each busbar 4 may also has more than two electrode connecting portions 42, so as to make some battery cells 12 connected in parallel and some battery cells 12 connected in series. In the embodiment, two ends of the plurality of busbars 4 arranged in rows each are provided with one busbar 4' only having one electrode connecting portion 42, and each busbar 4' further has an outside connecting portion 44 extending from the main body portion 41 so as to connect with an outside conductive wire (not shown). In the embodiment, each busbar 4 is made from the same material, such as a copper based metal, an aluminum base metal. However, in a varied embodiment, the electrode connecting portions 42 of the busbar 4 may be made from different materials, for example as shown in FIG. 5, two sides of a busbar 4 relative to an imaginary line L may be respectively made from an aluminum base metal and a copper based metal. Moreover, in the embodiment, the main body portions 41 of the plurality of busbars 4 are welded on the circuit traces 31, and each electrode connecting portion 42 of each busbar 4 protrudes from the main body portion 41 away from the bottom surface of the circuit board 3 and exhibits as a protruding block. Each electrode connecting portion 42 has a recessed groove 421 to connect with the electrode 121. In other embodiments, a structure and shape of the electrode connecting portion 42 may be changed to match with a structure and shape of the electrode 121.

The covering mechanism 5 is provided to the bottom surface of the circuit board 3, and comprises a plurality of sealing units 51 arranged along the first direction D1, and the plurality of sealing units 51 respectively correspond to the plurality of chambers 112. Each sealing unit 51 comprises a cover 52, two first sealing members 53 and a second sealing member 54. The cover 52 is made from an insulating material, such as plastic material, preferably for example polyester material. The first sealing member 53 and the second sealing member 54 each are made from a material which can be compressively elastically deformed, such as rubber material. The cover 52 extends along the second direction D2 and has two openings 521 arranged along the second direction D2. Referring to FIG. 6 to FIG. 9, the two openings 521 are respectively sheathed on two corresponding first sealing members 53 which are positioned along the second direction D2 and respectively belong to the two rows of the busbars 4, the two first sealing members 53 are respectively positioned in the two openings 521 and each are interposed between the cover 52 and the corresponding electrode connecting portion 42 to liquid-tight seal a gap between the cover 52 and the corresponding electrode connecting portion 42, the second sealing member 54 is positioned in the chamber 112 and is interposed between the cover 52 and the box body 11 to liquid-tight seal a gap between the cover 52 and the box body 11.

Also in combination with referring to FIG. 5, in the embodiment, the cover 52 of each sealing unit 51 further has a base portion 522 connecting with the circuit board 3 and a plugging portion 523 protruding from the base portion 522, and an outer periphery of the plugging portion 523 is tapered inwardly relative to an outer periphery of the base portion 522, and the plurality of openings 521 pass through the base portion 522 and the plugging portion 523. Each first sealing member 53 of each sealing unit 51 is provided in form of gasket and is sheathed on an outer periphery of the corresponding electrode connecting portion 42. The second sealing member 54 of each sealing unit 51 is provided in form of gasket and is sheathed on an outer periphery of the plugging portion 523. The plugging portion 523 has two side protruding ribs 524 which extend along the second direction D2 and are positioned at two opposite sides and protrude toward the chamber 112, and each side protruding rib 524 is formed with a latching channel 525 extending along the second direction D2 and adjacent to the base portion 522. A top portion of each spacing wall 111 is formed with two latching edge portions 113 respectively protruding toward two adjacent chambers 112, so as to respectively enter in two corresponding latching channels 525 and allow the two side protruding ribs 524 to respectively latch with and abut against two latching edge portions 113, therefore the cover 52 and the box body 11 are engaged more stably. Moreover, each side protruding rib 524 is further formed with a latching groove 526 spaced apart from the latching channel 525 and away from the base portion 522 relative to the latching channel 525 and allowing the second sealing member 54 to latch with the latching groove 526, therefore, when the cover 52 is covered on the box body 11, the plugging portion 523 is plugged in the chamber 112, and the latching edge portions 113 of the spacing wall 111 latches with and abuts against the side protruding rib 524 of the plugging portion 523 and the second sealing member 54 is positioned below the latching edge portion 113, which may have a better sealing effect. By that the plurality of sealing units 51 seal the plurality of chambers 112, the battery liquid of each chamber 112 can be prevented from leaking out.

Figure 9:
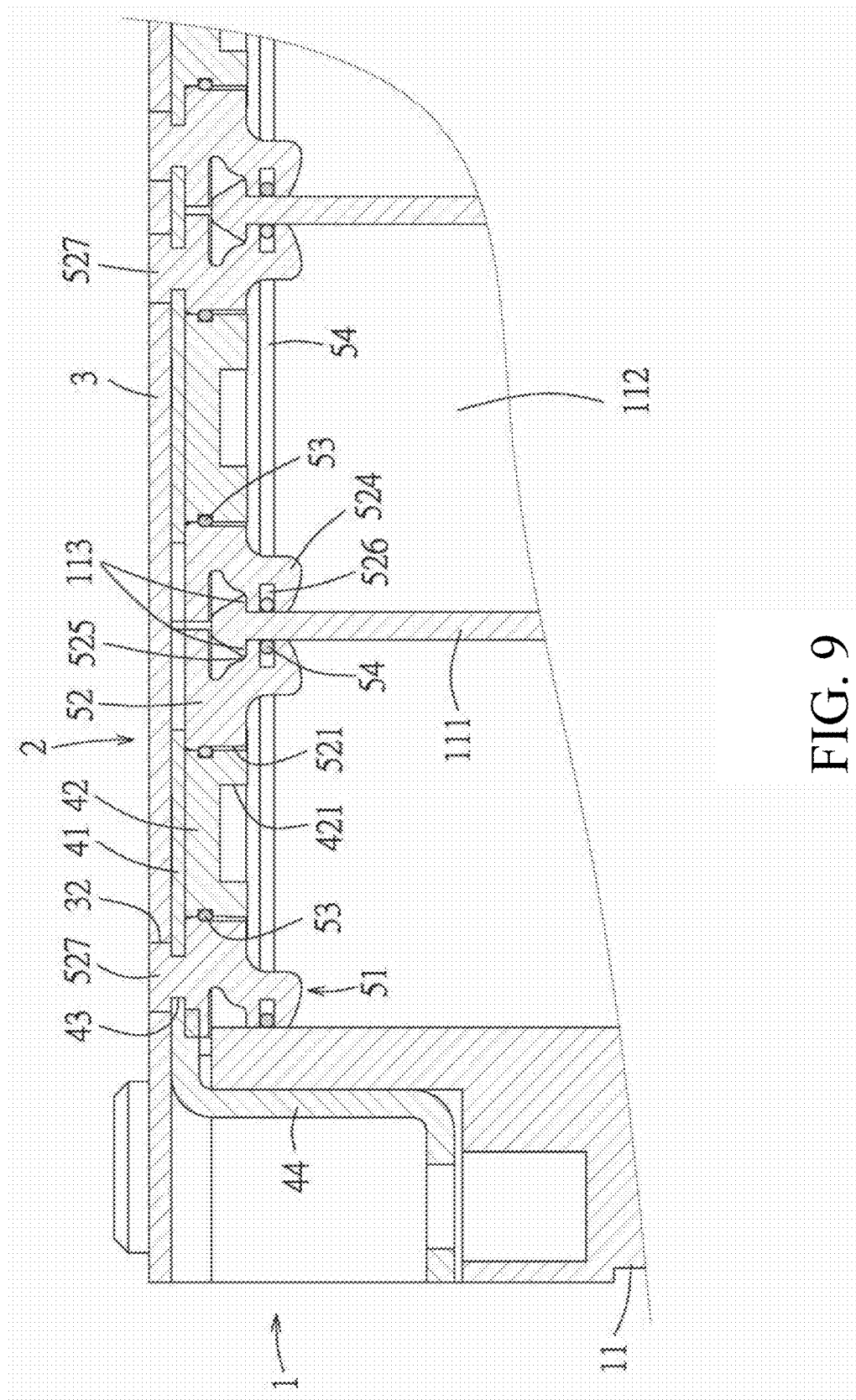
FIG. 9 is a partial enlarged view of FIG. 8.
Figure 10:
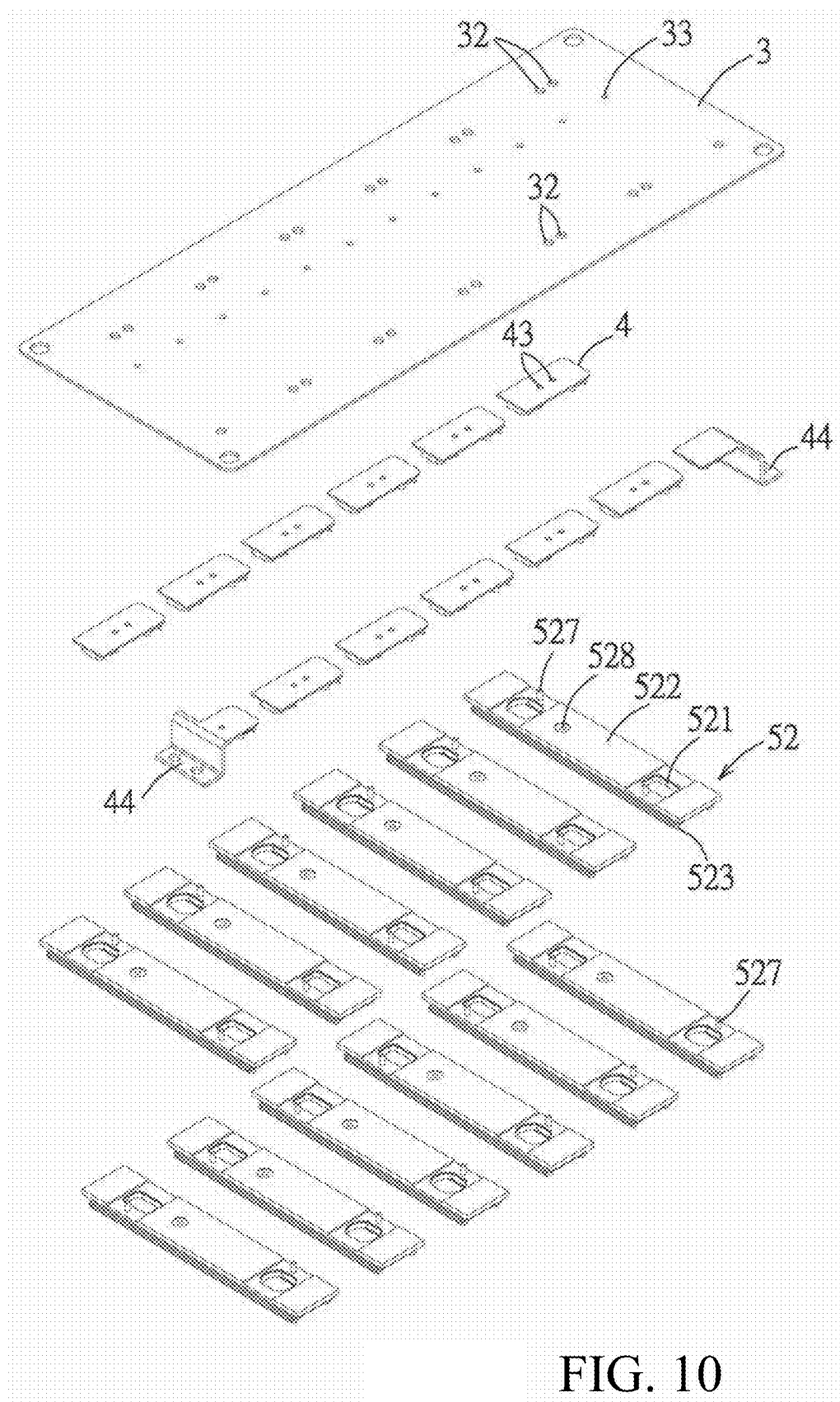
FIG. 10 is a perspective exploded view of the embodiment illustrating an assembling relationship between a fixing post of the covering mechanism of the battery connection module and the circuit board and the busbar before hot melted.
Figure 11:
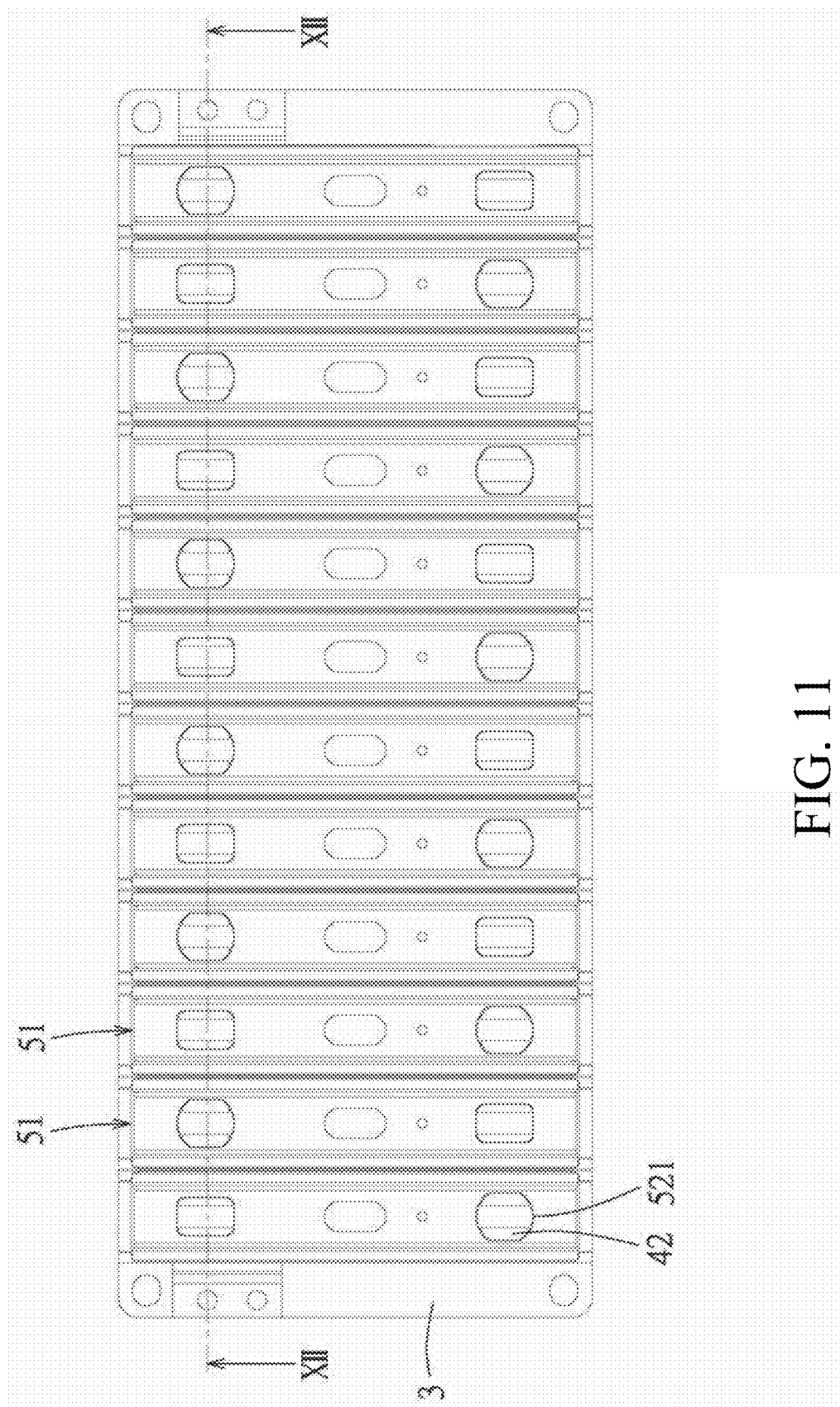
FIG. 11 is a top view after
Figure 12:
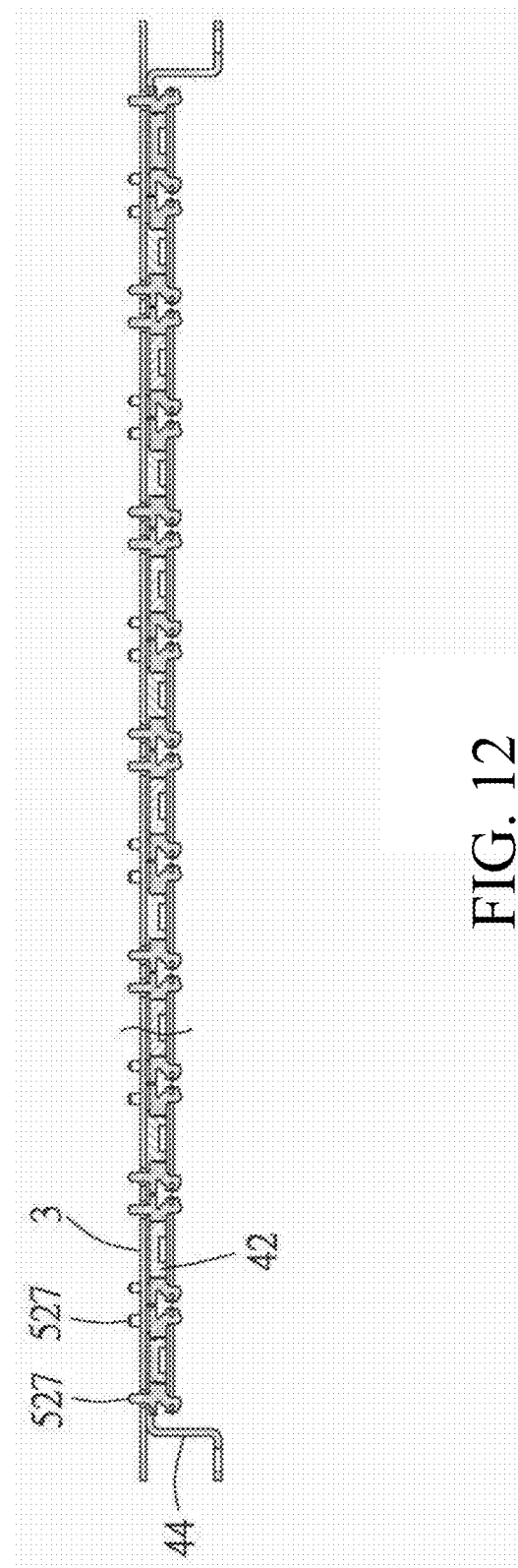
FIG. 12 is a cross sectional view taken along a line XII-XII of FIG. 11.
Figure 13:
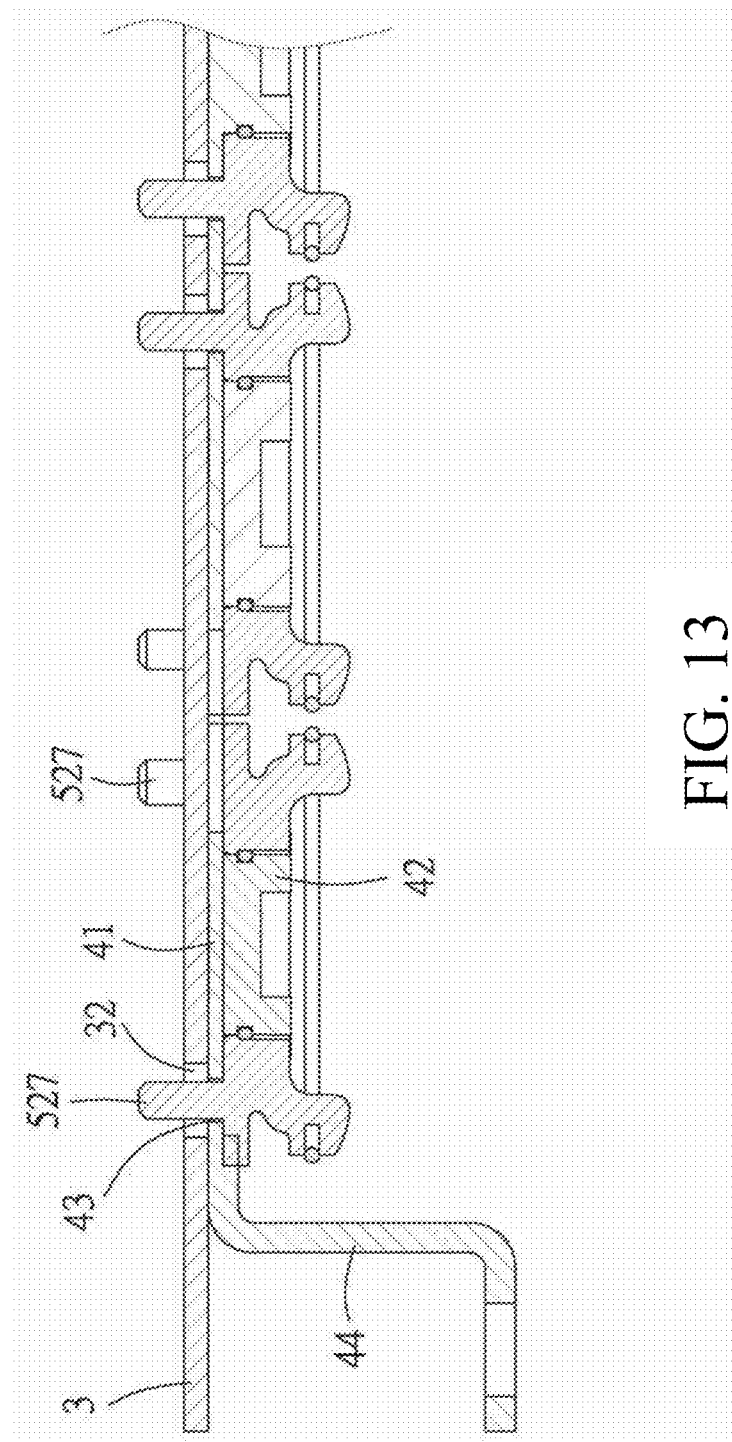
FIG. 13 is a partial enlarged view of FIG. 12.

Referring to FIG. 10 to FIG. 13, the cover 52 of each sealing unit 51 further has a plurality of fixing posts 527 protruding from the base portion 522, and the plurality of fixing posts 527 and the plugging portion 523 are positioned at two opposite sides of the base portion 522. The circuit board 3 and the main body portion 41 of the plurality of busbars 4 respectively have a corresponding fixing hole 32 and a fixing hole 43 corresponding to the fixing post 527 for passing through and fixing of the fixing post 527 to strengthen the fixing among the circuit board 3, the busbar 4 and the cover 52. FIGS. 10-13 illustrate a state before the plurality of fixing posts 527 are hot melted, in the embodiment, the plurality of fixing posts 527 are fixed and latched in the corresponding fixing holes 32 by a hot melt manner, referring to FIG. 9, FIG. 9 illustrates a state after the fixing post 527 is hot melted and is fixed and latched in the fixing hole 32. It should be noted that, in the embodiment, the covers 52 of the plurality of sealing units 51 are separated from each other and each are independently provided to the circuit board 3, however in a varied embodiment, the covers 52 of the plurality of sealing units 51 may be also integrally formed and connected together, so which is not limited to the embodiment. As shown in FIG. 10, in the embodiment, each busbar 4 has two fixing holes 43, each cover 52 has two fixing posts 527 provided diagonally, that is to say, the two fixing posts 527 of each cover 52 respectively pass through the two fixing holes 43 of the two busbars 4, in other words, the two fixing holes 43 of the busbar 4 each are passed through by one fixing post 527 of one cover 52 of two adjacent covers 52.

Again referring to FIG. 1 to FIG. 3, the cover 52 of each sealing unit 51 is formed with a first liquid injecting hole 528 which may be communicated with the chamber 112, the circuit board 3 is formed a plurality of second liquid injecting holes 33 respectively corresponding to the first liquid injecting holes 528 of the plurality of sealing units 51, by that the first liquid injecting hole 528 and the second liquid injecting hole 33 communicated with each chamber 112, so as to inject the battery liquid (generally is electrolyte), after the battery liquid is injected, the first liquid injecting hole 528 and the second liquid injecting hole 33 are sealed by a plug (shown) or other means.

The battery connection module 2 may be assembled in advance, then assembled with the battery box 1. When the battery connection module 2 is assembled with the battery box 1, as long as the battery connection module 2 covers the battery box 1, then screws 6 are fastened at four corners, the battery connection module 2 and the battery box 1 may be engaged and fixed. After the battery connection module 2 and the battery box 1 are assembled, the battery liquid is injected via the first liquid injecting hole 528 and the second liquid injecting hole 33, finally the first liquid injecting hole 528 and the second liquid injecting hole 33 are sealed. Therefore, an assembling process of the battery connection module 2 and the battery box 1 may be simple and easily operated.

In conclusion, the battery connection module 2 can be assembled as a module in advance, and incorporates the busbars 4, 4' and the covering mechanism 5 on the circuit board 3, the assembling process of the battery connection module 2 and the battery box 1 is simpler, more convenient and easily operated, and can be indeed seal the battery liquid, and can make the plurality of electrodes 121 in the battery box 1 to electrically connected.

However, the foregoing description is made only for the embodiments of the present disclosure, and it is not intended to limit the scope of implementing the present disclosure, any simple equivalent variations and modifications in accordance with the scope of the present disclosure and the contents of the present specification belong to the scope of the claims of the present disclosure.

What is claimed is:

1. A battery device, comprising:
    a battery box having a box body and a plurality of battery cells, the box body having a plurality of spacing walls arranged along a first direction and spaced apart from each other to define a plurality of chambers, and the plurality of battery cells being respectively provided to the plurality of chambers, each battery cell comprising a battery liquid and electrodes; and
    a battery connection module comprising:
        a circuit board extending along the first direction and provided with circuit traces,
        a plurality of busbars operatively associated with the circuit board in two rows spaced apart from each other and electrically connecting with the circuit traces, and each row being arranged along the first direction, each busbar having a main body portion connecting with a bottom surface of the circuit board and being wholly positioned below the bottom surface of the circuit board, each busbar having at least two electrode connecting portions protruding downwardly from the main body portion away from the bottom surface of the circuit board, the electrode connecting portions respectively connecting with the electrodes in different chambers so as to make the electrodes in the plurality of chambers connected in series, and
        a covering mechanism operatively associated with the circuit board and comprising a plurality of sealing units arranged along the first direction, and the plurality of sealing units respectively corresponding to the plurality of chambers, each sealing unit comprising a cover, two first sealing members and a second sealing member, the cover extending along a second direction perpendicular to the first direction and having two openings arranged along the second direction, the two openings being respectively sheathed on two corresponding electrode connecting portions which are positioned along the second direction and respectively belong to the two rows of the busbars, the two first sealing members being respectively positioned in the two openings and each being interposed between the cover and the electrode connecting portion to liquid-tight seal a gap between the cover and the electrode connecting portion, the second sealing member being positioned in the corresponding chamber and being interposed between the cover and the box body to liquid-tight seal a gap between the cover and the box body, the two first sealing members and the second sealing member being wholly positioned below the bottom surface of the circuit board.

2. The battery device according to claim 1, wherein each electrode connecting portion of each busbar exhibits as a protruding block.

3. The battery device according to claim 2, wherein each first sealing member of each sealing unit is provided in form of gasket and is sheathed on an outer periphery of the electrode connecting portion.

4. The battery device according to claim 1, wherein the cover of each sealing unit further has a base portion connecting with the circuit board and a plugging portion protruding from the base portion, and an outer periphery of the plugging portion is tapered inwardly relative to an outer periphery of the base portion, and the openings pass through the base portion and the plugging portion.

5. The battery device according to claim 4, wherein the second sealing member of each sealing unit is provided in form of gasket and is sheathed on the outer periphery of the plugging portion.

6. The battery device according to claim 5, wherein the plugging portion has two side protruding ribs extending along the second direction and positioned at two opposite sides and protruding toward the corresponding chamber, and each side protruding rib is formed with a latching channel extending along the second direction and adjacent to the base portion, a top portion of each spacing wall is formed with two latching edge portions respectively protruding toward two adjacent chambers to respectively enter into two corresponding latching channels and allow two corresponding side protruding ribs to respectively latch with and abut against the two latching edge portions.

7. The battery device according to claim 6, wherein each side protruding rib is further formed with a latching groove spaced apart from the latching channel and away from the base portion relative to the latching channel and allowing the second sealing member to latch with the latching groove.

8. The battery device according to claim 1, wherein the cover of each sealing unit further has a plurality of fixing posts, the circuit board and the plurality of busbars each have a corresponding fixing hole for passing through and fixing the corresponding fixing post.

9. The battery device according to claim 8, wherein each busbar has two fixing holes, the cover of each sealing unit has two fixing posts which are diagonally provided to the cover and each pass through one fixing hole of two busbars respectively belonging to the two rows, and the two fixing holes of each busbar each are passed through by one fixing post of one cover of two adjacent covers.

10. The battery device according to claim 8, wherein the plurality of fixing posts each are fixed and latched in the fixing hole by hot melt manner.

11. The battery device according to claim 1, wherein the cover of each sealing unit is formed with a first liquid injecting hole which may be communicated with the chamber, the circuit board is formed with a plurality of second liquid injecting holes respectively corresponding to the first liquid injecting holes of the plurality of sealing units.

12. The battery device according to claim 1, wherein the covers of the plurality of sealing units are separated from each other and each are independently provided to the circuit board.

13. A battery connection module, comprising:
a circuit board extending along a first direction and provided with circuit traces;
a plurality of busbars provided to a bottom surface of the circuit board in two rows spaced apart from each other and electrically connecting with the circuit traces, and each row being arranged along the first direction, each busbar having a main body portion connecting with the circuit board and at least two electrode connecting portions; and
a covering mechanism provided to the bottom surface of the circuit board and comprising a plurality of sealing units arranged along the first direction, each sealing unit comprising a cover, two first sealing members and a second sealing member, the cover extending along a second direction perpendicular to the first direction and having two openings arranged along the second direction, the two openings being respectively sheathed on two corresponding electrode connecting portions which are positioned along the second direction and respectively belong to the two rows of the busbars, the two first sealing members being respectively positioned in the two openings and each being interposed between the cover and the electrode connecting portion to liquid-tight seal a gap between the cover and the electrode connecting portion, the second sealing member being provided to an outer periphery of the cover,
wherein the cover of each sealing unit further has a plurality of fixing posts, the circuit board and the plurality of busbars each have a corresponding fixing hole for passing through and fixing the corresponding fixing post, and
wherein each busbar has two fixing holes, the cover of each sealing unit has two fixing posts which are diagonally provided to the cover and each pass through one fixing hole of two busbars respectively belonging to the two rows, and the two fixing holes of each busbar each are passed through by one fixing post of one cover of two adjacent covers.

14. The battery connection module according to claim 13, wherein each electrode connecting portion of each busbar exhibits as a protruding block.

15. The battery connection module according to claim 14, wherein each first sealing member of each sealing unit is provided in form of gasket and is sheathed on an outer periphery of the electrode connecting portion.

16. The battery connection module according to claim 13, wherein the cover of each sealing unit further has a base portion connecting with the circuit board and a plugging portion protruding from the base portion, and an outer periphery of the plugging portion is tapered inwardly relative to an outer periphery of the base portion, and the openings pass through the base portion and the plugging portion.

17. The battery connection module according to claim 16, wherein the second sealing member of each sealing unit is provided in form of gasket and is sheathed on the outer periphery of the plugging portion.

18. The battery connection module according to claim 13, wherein the plurality of fixing posts each are fixed and latched in the fixing hole by hot melt manner.

19. The battery connection module according to claim 13, wherein the covers of the plurality of sealing units are separated from each other and each are independently provided to the circuit board.

20. A battery device, comprising:
a battery box having a box body and a plurality of battery cells, the box body having a plurality of spacing walls arranged along a first direction and spaced apart from each other to define a plurality of chambers, and the plurality of battery cells being respectively provided to the plurality of chambers, each battery cell comprising a battery liquid and electrodes; and
a battery connection module comprising:
a circuit board extending along the first direction and provided with circuit traces,
a plurality of busbars provided to a bottom surface of the circuit board in two rows spaced apart from each other and electrically connecting with the circuit traces, and each row being arranged along the first direction, each busbar having a main body portion connecting with the circuit board and at least two electrode connecting portions, the electrode connecting portions respectively connecting with the electrodes in different chambers so as to make the electrodes in the plurality of chambers connected in series, and
a covering mechanism provided to the bottom surface of the circuit board and comprising a plurality of sealing units arranged along the first direction, and the plurality of sealing units respectively corresponding to the plurality of chambers, each sealing unit comprising a cover, two first sealing members and a second sealing member, the cover extending along a second direction perpendicular to the first direction and having two openings arranged along the second direction, the two openings being respectively sheathed on two corresponding electrode connecting portions which are positioned along the second direction and respectively belong to the two rows of the busbars, the two first sealing members being respectively positioned in the two openings and each being interposed between the cover and the electrode connecting portion to liquid-tight seal a gap between the cover and the electrode connecting portion, the second sealing member being positioned in the corresponding chamber and being interposed between the cover and the box body to liquid-tight seal a gap between the cover and the box body, wherein the cover of each sealing unit further has a base portion connecting with the circuit board and a plugging portion protruding from the base portion, and an outer periphery of the plugging portion is tapered inwardly relative to an outer periphery of the base portion, and the openings pass through the base portion and the plugging portion, wherein the second sealing member of each sealing unit is provided in form of gasket and is sheathed on the outer periphery of the plugging portion, and wherein the plugging portion has two side protruding ribs extending along the second direction and positioned at two opposite sides and protruding toward the corresponding chamber, and each side protruding rib is formed with a latching channel extending along the second direction and adjacent to the base portion, a top portion of each spacing wall is formed with two latching edge portions respectively protruding toward two adjacent chambers to respectively enter into two corresponding latching channels and allow two corresponding side protruding ribs to respectively latch with and abut against the two latching edge portions.

21. The battery device according to claim 20, wherein each side protruding rib is further formed with a latching groove spaced apart from the latching channel and away from the base portion relative to the latching channel and allowing the second sealing member to latch with the latching groove.

22. A battery device, comprising:
a battery box having a box body and a plurality of battery cells, the box body having a plurality of spacing walls arranged along a first direction and spaced apart from each other to define a plurality of chambers, and the plurality of battery cells being respectively provided to the plurality of chambers, each battery cell comprising a battery liquid and electrodes; and
a battery connection module comprising:
a circuit board extending along the first direction and provided with circuit traces,
a plurality of busbars provided to a bottom surface of the circuit board in two rows spaced apart from each other and electrically connecting with the circuit traces, and each row being arranged along the first direction, each busbar having a main body portion connecting with the circuit board and at least two electrode connecting portions, the electrode connecting portions respectively connecting with the electrodes in different chambers so as to make the electrodes in the plurality of chambers connected in series, and
a covering mechanism provided to the bottom surface of the circuit board and comprising a plurality of sealing units arranged along the first direction, and the plurality of sealing units respectively corresponding to the plurality of chambers, each sealing unit comprising a cover, two first sealing members and a second sealing member, the cover extending along a second direction perpendicular to the first direction and having two openings arranged along the second direction, the two openings being respectively sheathed on two corresponding electrode connecting portions which are positioned along the second direction and respectively belong to the two rows of the busbars, the two first sealing members being respectively positioned in the two openings and each being interposed between the cover and the electrode connecting portion to liquid-tight seal a gap between the cover and the electrode connecting portion, the second sealing member being positioned in the corresponding chamber and being interposed between the cover and the box body to liquid-tight seal a gap between the cover and the box body, wherein the cover of each sealing unit further has a plurality of fixing posts, the circuit board and the plurality of busbars each have a corresponding fixing hole for passing through and fixing the corresponding fixing post, and wherein each busbar has two fixing holes, the cover of each sealing unit has two fixing posts which are diagonally provided to the cover and each pass through one fixing hole of two busbars respectively belonging to the two rows, and the two fixing holes of each busbar each are passed through by one fixing post of one cover of two adjacent covers.

23. The battery device according to claim 22, wherein the at least two electrode connecting portions protrude downwardly from the main body portion away from the bottom surface of the circuit board.

24. The battery connection module according to claim 13, wherein the at least two electrode connecting portions protrude downwardly from the main body portion away from the bottom surface of the circuit board.

25. The battery device according to claim 20, wherein the at least two electrode connecting portions protrude downwardly from the main body portion away from the bottom surface of the circuit board.

* * * * *